Patented July 3, 1928.

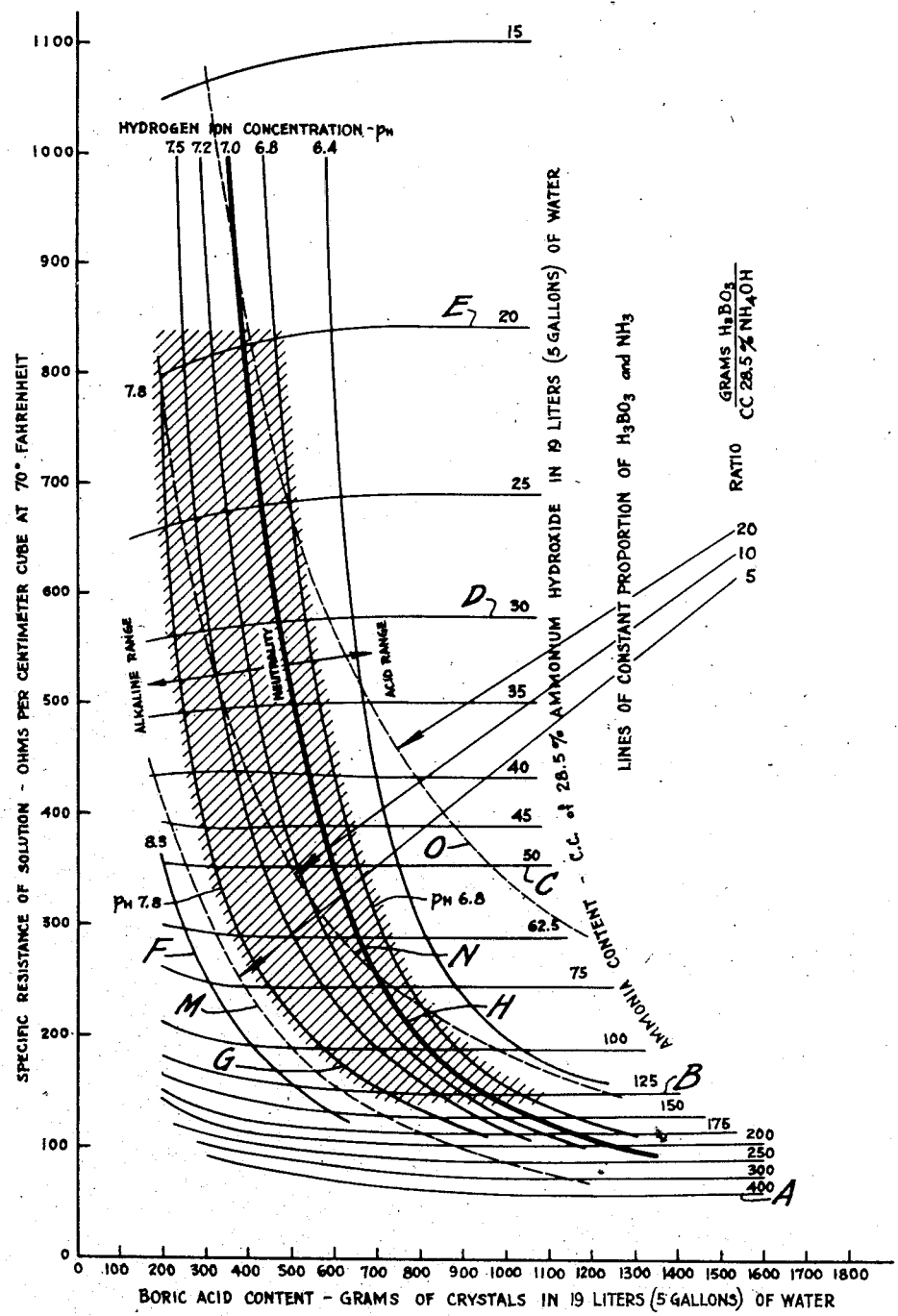

1,675,828

UNITED STATES PATENT OFFICE.

HUMPHREYS O. SIEGMUND, OF WEST ORANGE, NEW JERSEY, ASSIGNOR TO WESTERN ELECTRIC COMPANY, INCORPORATED, OF NEW YORK, N. Y., A CORPORATION OF NEW YORK.

ELECTROLYTE.

Application filed December 29, 1924. Serial No. 758,574.

This invention relates to electrolytes for electrolytic cells and to methods for producing the same. It has particular reference to electrolytes for use in electrolytic condensers, such as are employed in telephone power plant installations, for example, though it is not limited to this class of electrolytic condensers alone.

As is well known, a dielectric film is formed on the surfaces of film-forming metals such as aluminum, when they are employed as anodes in an electrolyte. This film gradually builds up to a thickness corresponding to the voltage impressed, thereby retarding the flow of current from the anode to the electrolyte. The combination of this film with the electrode and electrolyte forms a condenser when the current-flow is such as to make the film-forming electrode an anode. The impedance of this condenser is equal to the square root of the sum of the squares of the reactance and the resistance, where the resistance is equal to the sum of the resistance of the electrolyte and the dielectric loss of the film. The characteristics of this film are affected by the composition and concentration of the electrolyte and among those factors which influence the choice of the electrolyte are the life of the electrolyte and the impedance and leakage current of the condenser formed.

Some of the more common electrolytes which are employed in electrolytic condensers are borates and boric acid, tartrates and tartaric acid, citrates and citric acid and phosphates with phosphoric acid. This invention has particular reference to electrolytes comprising ammonium hydroxide, boric acid and water, though it will be appreciated that certain features of the invention are not limited to this class of electrolytes alone.

It is an object of the invention to provide an electrolytic condenser electrolyte which possesses a long life and which will produce a condenser of suitably low impedance.

A further object of the invention is a simple and efficient method of producing such electrolytes.

A feature of the invention is the production of a group of ammonium hydroxide-boric acid electrolytes that have definite hydrogen ion concentration values and specific resistance values.

In accordance with the invention there have been worked out certain relations from which the proper proportions of ammonium hydroxide, boric acid and water may be determined to produce electrolytes having definite specific resistance and hydrogen ion concentration values.

When used across circuits of comparatively low potential, such as in telephone exchange power plant installations where the electrolytic condenser is applied across circuits of comparatively low, unidirectional, pulsating potential, it has been found that the leakage current does not form an especially important factor in the choice of the electrolyte, so long as its value is reasonably low; a leakage current of 4 or 5 microamperes per square inch, for instance, has been found permissible. On the other hand, low impedance of condensers and long life of electrolytes have been found to be especially desirable in such condensers.

The single figure of the drawing shows a graphical representation of the relation between the proportions of the components and the specific resistance and hydrogen ion concentration $P_H$ values of electrolytes comprising ammonium hydroxide ($NH_4OH$), boric acid ($H_3BO_3$) and water.

A fuller understanding of the invention will be had from the more detailed description to follow.

In accordance with a feature of the invention there is provided a group of electrolytes comprising ammonium hydroxide, boric acid and water having specific resistance values between 150 and 800 ohms per cubic centimeter and hydrogen ion concentration values between 6.8 and 7.8. Such electrolytes have been found to comprise between 250 and 900 grams of boric acid and between 20 and 125 cubic centimeters of a 28.5% ammonium hydroxide solution dissolved in 19 liters (5 gallons) of water. These electrolytes have been found to be satisfactorily long lived and to form low impedance condensers, which characteristics are desirable in condensers across circuits of comparatively low potential, as in telephone power plant installations, for example.

Any of the ordinary types of electrolytic condensers comprising, for example, an insulating casing, a cover for the casing, an aluminum or other film forming material anode, and suitable cathodes suspended from, and attached to terminals in, the cover may be employed with the electrolytes of the invention. The electrolytes of the invention are introduced into the casing, the electrodes being immersed in them.

It has been found that electrolytes which are appreciably alkaline dissolve the film-forming electrode more readily and rapidly than neutral electrolytes and are therefore short-lived due to the contamination of the electrolytes by the dissolved metal. Appreciably alkaline electrolytes have also been found to be undesirable in that their use results in excessively high leakage currents particularly at elevated temperatures. Alkaline electrolytes were found, however, to possess the advantage of not appreciably inciting corrosion on the surface of the film-forming electrodes.

Acid electrolytes, such as solutions saturated with boric acid and containing only a relatively small quantity of ammonia hydroxide, were found to incite corrosion on the film-forming electrode. The hydrogen ion concentration of acid electrolytes was also found to be substantially unstable with changes in fluid concentration, thereby making such electrolytes further undesirable. Acid electrolytes have, however, been found to produce thick films on the film-forming electrode, thereby causing low leakage currents; this fact tends to make acid electrolytes desirable in those cases in which the likelihood of corrosion occurring is of minor consideration. As minimum leakage currents are not particularly important in condensers for use in such circuits as those encountered in telephone power plant installations while the life of electrolytes and electrodes is an especially important factor in such cases, acid electrolytes should be avoided in such use of electrolytic condensers.

For the production of electrolytes having long life and producing low impedance condensers, a solution must be of given resistance and a balance must be reached between that alkalinity which will substantially avoid corrosion of the positive film-forming electrode and that alkalinity which will produce a rapid contamination of the electrolytes by dissolving the film. It has been found that this balanced condition is fulfilled by electrolytes which are nearly neutral and slightly alkaline.

In the figure of the drawing, the set of curves A B C D E represents the relation between the specific resistance and the boric acid content of various electrolytes having constant ammonia content. The curves F G H show the relation between the specific resistance, the hydrogen ion concentration, and the composition, of various electrolytes; these curves were produced by determining these points on the curves A B C D E, which represent the compositions having certain definite hydrogen ion concentration values, and then drawing the individual curves through these points. Solutions which are substantially neutral (those having $P_H$ values substantially equal to 7) are those represented by the curve H; solutions which are acid (those having $P_H$ values less than 7) are represented by the curves to the right of curve H, this range of curves being therefore termed the acid range; alkaline solutions (those having $P_H$ values greater than 7) are represented by the curves to the left of curve H, this range of curves being termed the alkaline range. The curves M N O represent the relation between the individual characteristics of electrolytes having constant proportions of boric acid and ammonia, the boric acid-ammonia ratios which are represented by the individual curves being shown at the right of the drawing.

Referring to the figure of the drawing, the specific resistance and strength of acidity or alkalinity (hydrogen ion concentration designated by $P_H$) of various electrolytes composed of ammonium hydroxide, boric acid and water are shown by the curves. In accordance with these curves, it has been found that for acid or slightly alkaline solutions the specific resistance of a particular electrolyte is fixed by the ammonium hydroxide content and is practically independent of the boric acid content; and, further, that the proportions of boric acid and ammonium hydroxide to form neutral solutions vary with the degree of dilution by water.

As a result of the former of these characteristics, electrolytes having any desired value of specific resistance may be formed by mixing varying quantities of boric acid, ammonum hydroxide and water while maintaining the ratio of ammonium hydroxide to water constant. For example, an electrolyte having a specific resistance of 350 ohms per cubic centimeter may be formed by mixing 300 grams of boric acid with 19 liters of water and 50 cubic centimeters of 28.5% ammonium hydroxide, or by mixing 1200 grams of boric acid with the same amounts of water and ammonium hydroxide. In this manner, electrolytes having specific resistances which are constant and hydrogen ion concentration values varying from appreciably alkaline to appreciably acid can be produced.

The latter of these results will be more evident by comparing the curves F G H, representing the characteristics of electrolytes having definite $P_H$ values, with the curves M N O, which represent the characteristics of electrolytes having constant proportions of boric acid and ammonium hydroxide. The curves M N O, it will be noted, cross the curves of constant hydrogen ion concentration F G H and as a result of these intersections it follows that the hydrogen ion concentration of a solution containing given amounts of boric acid and ammonium hydroxide will depend upon the amount of water present or upon the degree of dilution by water. The divergence of these two sets of curves is greatest in the acid range and it is only in the alkaline range where $P_H$ equals approximately 8 that the curves approach coincidence. Physically interpreted, this means that the strength of acidity or alkalinity of many ammonium borate solutions may be appreciably changed by the addition of water or, if desired, acid electrolytes may be neutralized or made alkaline by the addition of an amount of water which will produce a solution of the concentration which corresponds on the curve to the hydrogen ion concentration value desired. Solutions whose hydrogen ion concentration value is approximately equal to 8, are not, however, appreciably changed as regards their hydrogen ion concentration by the addition of water. Solutions having hydrogen ion concentration values which are equal and which are less than 8, but having different specific resistances will, therefore, comprise different proportions of boric acid and ammonium hydroxide.

Electrolytes comprising boric acid, ammonium hydroxide and water which are nearly neutral and slightly alkaline and produce low impedance condensers have been found to comprise the band of electrodes represented by the shaded region in the drawing. This band of electrolytes comprises those obtained by mixing ammonium hydroxide, boric acid and water on the basis of a hydrogen ion concentration value fixed between the limits of 6.8 and 7.8. While all electrolytes lying in this band have been found satisfactory, the preferred series of electrolytes comprises those between $p_H=7.5$ and $p_H=7.2$, and above the "150 ohm per cubic centimeter" resistance line.

The proportions of ammonium hydroxide boric acid and water which may be employed in making up these preferred electrolytes are given in the following table in accordance with the curves of the invention.

Table I.

| Resis. ohms/cc. | cc. 28.5% NH₄OH in 5 gal. H₂O | Gr. H₃BO₃ in 5 gal. H₂O | | Ratio of gr. H₃BO₃ to cc. NH₄OH | |
|---|---|---|---|---|---|
| | | $p_H=7.5$ | $p_H=7.2$ | $p_H=7.5$ | $p_H=7.2$ |
| 150 | 125 | 830 | 900 | 6.6 | 7.2 |
| 200 | 95 | 670 | 750 | 7.1 | 7.9 |
| 250 | 74 | 550 | 640 | 7.4 | 8.6 |
| 300 | 60 | 490 | 570 | 8.2 | 9.5 |
| 350 | 50 | 430 | 520 | 8.6 | 10.4 |
| 400 | 44 | 400 | 480 | 9.1 | 10.9 |
| 500 | 35 | 340 | 420 | 9.7 | 12.0 |
| 600 | 28 | 300 | 380 | 10.7 | 13.6 |
| 800 | 20 | 250 | 330 | 12.5 | 16.5 |

Table II.

| Resis. ohms/cc. | cc. 28.5% NH₄OH per liter of H₂O | Gr. H₃BO₃ per liter of H₂O | |
|---|---|---|---|
| | | $p_H=7.5$ | $p_H=7.2$ |
| 150 | 6.6 | 43.8 | 47.5 |
| 200 | 5.02 | 35.4 | 39.6 |
| 250 | 3.91 | 29.1 | 33.8 |
| 300 | 3.17 | 25.9 | 30.1 |
| 350 | 2.64 | 22.7 | 27.5 |
| 400 | 2.32 | 21.2 | 25.4 |
| 500 | 1.85 | 17.9 | 22.2 |
| 600 | 1.48 | 15.8 | 20.1 |
| 800 | 1.06 | 13.2 | 17.4 |

Table I gives the characteristics of various electrolytes whose compositions are expressed in terms of a water content of 5 gallons, while Table II gives the characteristics of the same electrolytes having their compositions expressed in terms of a water content of one liter.

The proportions of ammonium hydroxide, boric acid and water which may be employed may be considerably varied, changes in such proportions varying the specific resistance and hydrogen ion concentration of the particular electrolyte formed. As a general rule, the specific resistance has been found to depend upon and increase with the ratio, weight of water : weight of ammonia ($NH_3$), while the hydrogen ion concentration value has been found to be dependent upon the ratio, weight of ammonia : weight of boric acid ($H_3BO_3$), and the degree of dilution by water. By actual test, it has been found that the electrolytes contained in the band shaded in the drawing possess long life and form condensers having impedances which are particularly well adapted for use in such circuits as are encountered in telephone power plant installations, for example. While preferred proportions have been stated herein, it will be understood, however, that it is not intended to impose any restrictions upon the proportions other than those set forth in the claims.

The range in temperatures which may be employed with the electrolytes of the invention is dependent primarily upon the composition of the particular electrolyte employed, any one electrolyte being substantially limited to use at a temperature not appreciably lower than the saturation temperature of said electrolyte. The usual room temperatures have been found to be substantially above the lower limit as defined above.

The voltages which may be satisfactorily employed with the electrolytes of the invention may be considerably varied, actual practice having shown that condensers containing these electrolytes may be satisfactorily applied across circuits of from 2 to 300 volts potential, at least.

Any suitable film-forming electrolyte may be used to replace ammonium borate solutions so long as the particular electrolyte employed possesses specific resistance and hydrogen ion concentration values lying in the regions defined in the description of the curves referring to boric acid.

The impedance of the electrolyte in a given condenser is governed not only by the specific resistance of the electrolyte but also by the specific construction of the condenser, the applied voltage and operating temperature. The factors of design which determine this resistance are the distance between and the area of the plates of the condenser. For example, the resistance of the electrolyte will vary directly with the thickness of the electrolyte (distance between the plates) and inversely with the cross-section of the electrolyte (area of the plates).

The concentration of ammonium hydroxide as employed herein is intended to define the percentage by weight of ammonia ($NH_3$) contained in the hydroxide solution.

While reference has been made herein to the use of the electrolytes of the invention in such condensers as are employed in telephone power plant installations, it is evident that the invention is not limited to this particular type of condenser alone, but is susceptible of various applications and adaptations within the scope of the appended claims.

What is claimed is:

1. A film forming electrolyte which comprises a mixture of a solution of an acid, a solution of a base, and water in such proportions that said mixture posseses a specific resistance value between 150 and 800 ohms per cubic centimeter and a hydrogen ion concentration value between 6.8 and 7.8.

2. A film forming electrolyte which comprises a mixture of boric acid, ammonium hydroxide and water in such proportions that said mixture possesses a hydrogen ion concentration value between 6.8 and 7.8 and a specific resistance value between 150 and 800 ohms per cubic centimeter.

3. A film forming electrolyte which comprises a mixture of an acid, ammonium hydroxide, and water, the ratio of the volume of water in cubic centimeters to the volume of 28.5% ammonium hydroxide being as great as 152 and the ratio of the amount of water to the amount of acid being such that the electrolyte is substantially neutral.

4. A film forming electrolyte which comprises a mixture of boric acid, ammonium hydroxide and water, the ratio of the volume of water in cubic centimeters to the volume of 28.5% ammonium hydroxide in cubic centimeters being as small as 950 and the ratio of the volume of water to the weight of boric acid being such that the electrolyte possesses a hydrogen ion concentration value between 6.8 and 7.8.

5. A film forming electrolyte which comprises the following substances in substantially the following proportions, water 19 liters, 28.5% ammonium hydroxide 20 to 125 cubic centimeters, boric acid 250 to 900 grams, the hydrogen ion concentration of said electrolyte being between 6.8 and 7.8.

6. A film forming electrolyte which comprises substantially 250 to 900 grams of boric acid and ammonium hydroxide dissolved in 19 liters of water, the amount of ammonium hydroxide being at least small enough to produce a high specific resistance, and a hydrogen ion concentration between 6.8 and 7.8.

7. A film forming electrolyte which comprises substantially 250 to 900 grams of boric acid and ammonium hydroxide dissolved, in 19 liters of water, the amount of ammonium hydroxide being at least small enough to produce a specific resistance between 150 and 800 ohms per cubic centimeter, and a hydrogen ion concentration between 6.8 and 7.8.

8. A film forming electrolyte which comprises substantially 20 to 125 cubic centimeters of 28½% ammonium hydroxide and boric acid in 19 liters of water, the amount of boric acid being sufficient to produce a substantially neutral solution.

9. A film forming electrolyte which comprises substantially 20 to 125 cubic centimeters of 28½% ammonium hydroxide and boric acid in 19 liters of water, the amount of boric acid being sufficient to produce a hydrogen ion concentration value between 6.8 and 7.8.

10. A film forming electrolyte which comprises 28½% ammonium hydroxide and boric acid dissolved in 19 liters of water, the ratio of the weight in grams of boric acid to the volume in cubic centimeters of ammonium hydroxide being between 6.6 and 16.5, and the hydrogen ion concentration being between 6.8 and 7.8.

11. A film forming electrolyte comprising boric acid, ammonium hydroxide and water in such proportions as to possess a specific resistance between 150 and 800 ohms per cubic centimeter and a hydrogen ion concentration value between 7.2 and 7.5.

In witness whereof, I hereunto subscribe my name this 26th day of December, A. D. 1924.

HUMPHREYS O. SIEGMUND.